United States Patent [19]

Webb

[11] 4,210,613
[45] Jul. 1, 1980

[54] WATER TREATING DEVICE

[76] Inventor: William G. Webb, 6564 Ralston St., Ventura, Calif. 93003

[21] Appl. No.: 894,055

[22] Filed: Apr. 6, 1978

[51] Int. Cl.² .............................................. B01F 3/04
[52] U.S. Cl. .................................... 261/120; 210/220; 210/242 A; 261/77; 261/123; 261/124
[58] Field of Search ..................... 261/77, 91, 93, 120, 261/123, 124, 142, DIG. 75; 210/242 A, 220

[56] References Cited

U.S. PATENT DOCUMENTS

| | | | |
|---|---|---|---|
| 1,791,949 | 2/1931 | Boulade | 261/142 X |
| 2,630,749 | 3/1953 | Ball et al. | 261/77 X |
| 3,365,860 | 1/1968 | Boris | 261/77 X |
| 3,758,083 | 9/1973 | Palmer | 261/120 X |
| 3,814,395 | 6/1974 | Kaelin | 261/91 X |
| 3,829,070 | 8/1974 | Reba et al. | 261/77 |
| 3,855,367 | 12/1974 | Webb | 261/77 |
| 3,968,086 | 7/1976 | Romanowski | 261/77 |
| 4,051,035 | 9/1977 | Boschen et al. | 261/77 X |
| 4,051,204 | 9/1977 | Muller et al. | 261/DIG. 75 |
| 4,060,574 | 11/1977 | Verner et al. | 261/77 |

FOREIGN PATENT DOCUMENTS 1482191  8/1977  United Kingdom ..................... 261/77

*Primary Examiner*—Richard L. Chiesa
*Attorney, Agent, or Firm*—Lyon & Lyon

[57] ABSTRACT

A water treating or aeration device for transferring gases to a liquid such as used for waste water treatment. The aeration device is comprised of an elongate hollow tube supported in an upright position having a bell-shaped member attached to one end forming a chamber between the inside of the tube and the outside of the bell-shaped member. The chamber is enclosed by a ring attached to the bell-shaped member and flaring outwardly into abutment with the inside of the tube. A gas, such as air, is supplied to the chamber and discharged into the interior of the tube through a plurality of apertures in the ring closing said chamber. A cone mounted on a base plate is positioned beneath the entrance of the bell-shaped member and secured to the aeration device or tube by a plurality of adjustable legs. Air introduced into the chamber is discharged through the apertures drawing fluid in a swirling motion through said bell-shaped member up and out through the upper end of the hollow tube.

1 Claim, 5 Drawing Figures

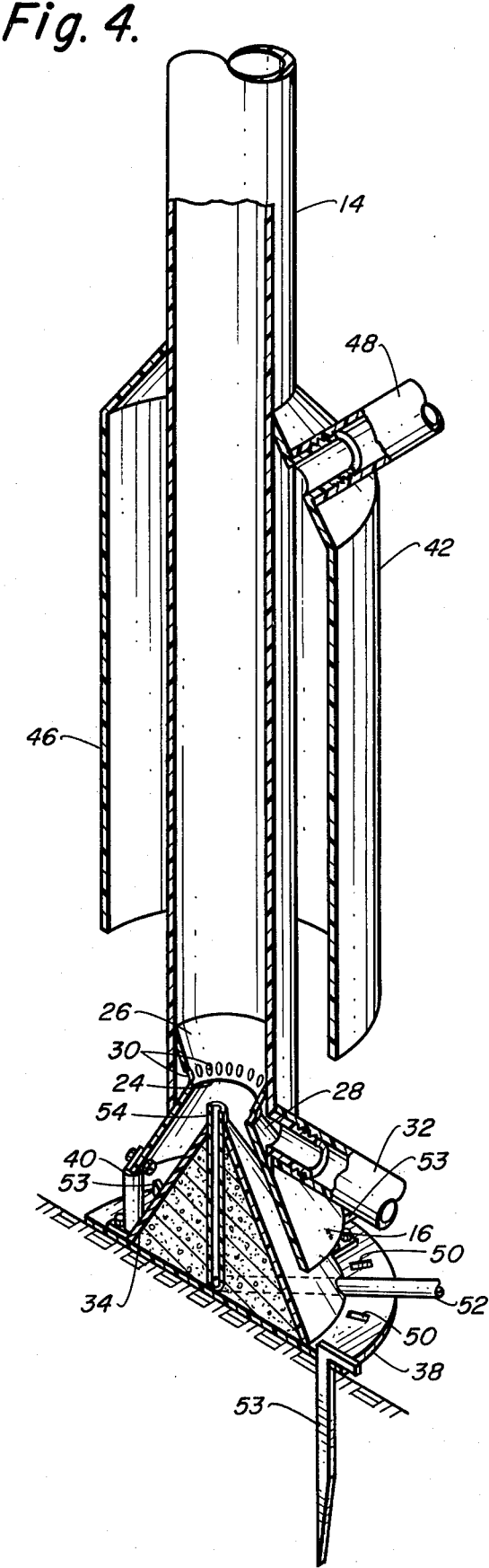
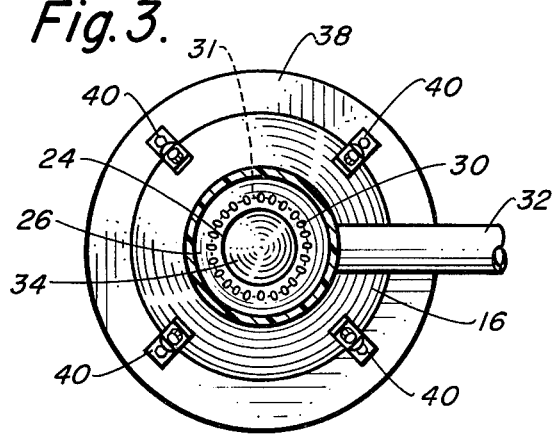
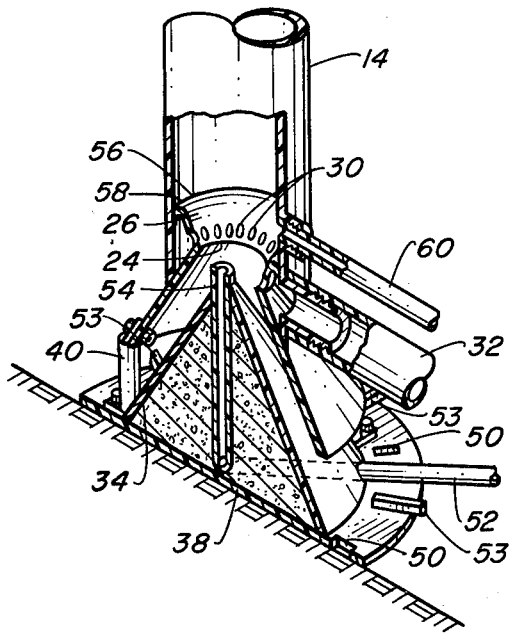

WATER TREATING DEVICE

BACKGROUND OF THE INVENTION

This invention relates to mixing and aeration of liquids, and more particularly relates to a venturi aeration device.

In many instances it is desirable to circulate and aerate a fluid, such as water, to remove harmful chemicals as well as add oxygen to the water. An aeration device may be beneficially employed in stagnant or polluted bodies of water to promote oxygenation for marine life and to assist in the bio-decomposition of pollutants. Such aeration is an important factor in the purification of water and is used particularly for waste water treatment. The principal objects of aeration are to add gases or volatile substances to the water or remove them or carry out both objectives simultaneously. Aeration can also be utilized to keep biological solids in suspension for treatment purposes.

Aeration in addition to or aside from mixing purposes can function to add oxygen in natural or waste water treatment to promote biochemical and chemical processes as well as the addition of oxygen to ground waters to oxidize and dissolve iron and manganese. Aeration can also be used for the removal of carbon dioxide and reduction of corrosion and interference with lime soda softening, as well as for the removal of hydrogen sulfide, odor, tastes, and decrease metal corrosion and concrete and cement deterioration. This process can also improve the efficiency of chlorination and remove volatile oils, odor and taste-producing substances caused by algae and other micro-organisms.

There is a wide choice of equipment that can be used for effective aeration of fluids, and in particular waste water. These devices can be divided into common classes which include diffused aeration systems; submerged turbine aerators; high and low-speed surface aerators; dispersed aerators; gravity aerators and spray aerators. Diffused air was the earliest aeration system and continues to be used. Surface aerators and turbine aerators have markedly increased in use in recent years. Submerged turbine aerators have been used where relatively short detention times have been required.

Transfer of gas, and in particular oxygen, occurs in three phases. The first phase is the contact of the oxygen molecules with a liquid surface producing an equilibrium condition at the interface between two compounds. In the second phase, oxygen molecules pass through the film or interface by diffusion and in the third phase the oxygen is mixed in the liquid or water by diffusion and convection. Turbulence of the surface of the liquid increases the surface and is responsible for increasing oxygen transfer to the body of liquid. Thus, the goals of aerator design and use are to generate the largest practicable area of interface between a given liquid volume and air; then build up a thick interfacial film by breaking it down and having as long as possible exposure time while maintaining the highest possible driving force or concentration difference for absorption or desorption.

In a diffused aeration system the transfer of oxygen depends upon the bubble size with problems being experienced in breaking down the bubbles to their smallest component. Further, the diffused system is not particularly adaptable for use in deep bases. In addition, fine bubble diffusers are subject to plugging problems often requiring air filtration and, usually, properly designed long narrow basins, resulting in increased construction costs. The submerged turbine aerator, while more efficient below the surface than diffused air, needs very high horsepower due to the lower oxygen transfer efficiencies. The surface aerator has the highest oxygen transfer but requires a very large area for proper aeration.

SUMMARY OF THE INVENTION

The purpose of the present invention is to provide an aeration device with improved gas transfer and lower power requirements.

This invention is an improvement on the aeration and antisiltation system disclosed in U.S. Pat. No. 3,855,367, issued Dec. 17, 1974, to the applicant for the invention disclosed herein.

According to the present invention, an aeration device is provided having an elongate hollow tube supported in an upright position and having a bell-shaped member on its lower end. The aeration device is supported vertically with the entrance to the bell-shaped member above the bottom of a body of liquid. The bell-shaped member terminates inside the elongate tube, forming a venturi restriction or throat and an annular ring attached to the throat and extending to the inside surface of the elongate tube forms a chamber between the bell-shaped member and tube. A gas or air is introduced into the chamber and is discharged through apertures in the annular ring to create a draft through the throat of the venturi. The air and liquid flowing upward through the tube forms a turbulent vortex-like flow thoroughly aerating the fluid or water, which is discharged through the top of the tube, preferably below the water line, creating convection currents thereby increasing mixing efficiency.

The aeration device is constructed to maximize the breakup of gas bubbles to create the largest possible interface between liquid and gas, thus producing maximum transfer of gas to the fluid. In addition, a cone positioned at the entrance to the mouth of the bell-shaped member increases flow and turbulence, also increasing surface contact between gas and fluid. The cone has a conduit embedded in it which opens at the apex of the cone immediately proximate the throat of the venturi formed in the bell-shaped member for introducing a chemical to treat the liquid being aerated, if desired. Treatment by additional chemicals is also provided for by rolling the peripheral edge of the annular ring to form an annular channel between the rolled edge and the inside of the tube into which additional chemicals for treatment of the liquid can be introduced.

Because of the angle coming from the bottom of the bell-shaped member to the venturi throat and the opposite angle of the shirt or flare outward from the float, a low-pressure area is formed just above the throat. That is, the flow normally follows the angle of the bell-shaped member and produces a high-velocity flow through the throat which causes back spin mixing in the low-pressure area around the flare of the skirt, just above the throat which induces a turbulence in that area. This backspin mixing or induced turbulence has a tendency to break up solids to their lowest common denominator, which alleviates the possibility of plugging problems in the orifices. This backspin mixing or induced turbulence in this area also results in the break-up of air bubbles from the orifice into micro-fine bubbles and as far as the air supply system is concerned gives it a negative rather than a positive pressure. That is, there is no back pressure against the air supply system allowing it to function with a minimum of power.

The modifications which permit the addition of one or more chemicals during the aeration process is extremely effective because of the backspin mixing or induced turbulence. This highly turbulent mixing increases the effectiveness of chemicals added by forcing greater intimate contact of bacteria and chemicals, thus reducing the amount of chemical necessary to achieve maximum results (i.e. maximum kill). The turbulent backspin mixing also reduces the amount of treatment required prior to discharge for the removal of excess chemicals, such as chlorine, which heretofore have been added in excessive amounts because of the inability of present systems to provide adequate mixing.

The aeration device may be freestanding on a base attached to the cone which is secured to the tube by adjustable legs or may be strapped to a piling by means of saddle blocks secured to the tube. The base plate in the freestanding model can be secured to the body of a bottom of water with sand spikes through slots around the periphery of the base. Since in many cases the device is large and difficult to handle, a collar may be provided on the exterior of the elongate tube forming therewith a hollow cylindrical cavity between the outside of the tube and the inside of the collar. A conduit supplying air or other suitable gas to the collar acts to lift the collar when it is situated in the fluid allowing removal of the device or simplifying maneuverability.

It is one object of the present invention to provide an aeration device which maximizes interface of a gas with a liquid for aeration.

It is another object of the present invention to provide an aeration device which minimizes the amount of power needed during the aeration process.

Yet another object of the present invention is to provide an aeration device which maximizes breakup of the gas into minute bubbles.

Still another object of the present invention is to provide an aeration device adaptable for support on rectangular, square, or cylindrical pilings.

Still another object of the present invention is to provide an aeration device which can be freestanding.

Yet another object of the present invention is to provide an aeration device having a flotation collar for simplifying easy maneuverability.

Still another object of the present invention is to provide an aeration device having a gas injection system which maximizes breakup of the gas into minute bubbles.

Still another object of the present invention is to provide an aeration device which permits the addition of one or more chemicals during the aeration process.

These and other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 3 is a sectional view of the aeration device taken at 3—3 of FIG. 2.

FIG. 4 is a partial sectional view similar to FIG. 2 illustrating an alternative embodiment of the aeration device.

FIG. 5 is a partial section illustrating a variation in the lower portion of the aeration device of FIG. 4.

DETAILED DESCRIPTION OF THE PREFERRED EMBODIMENT

Figure 1:
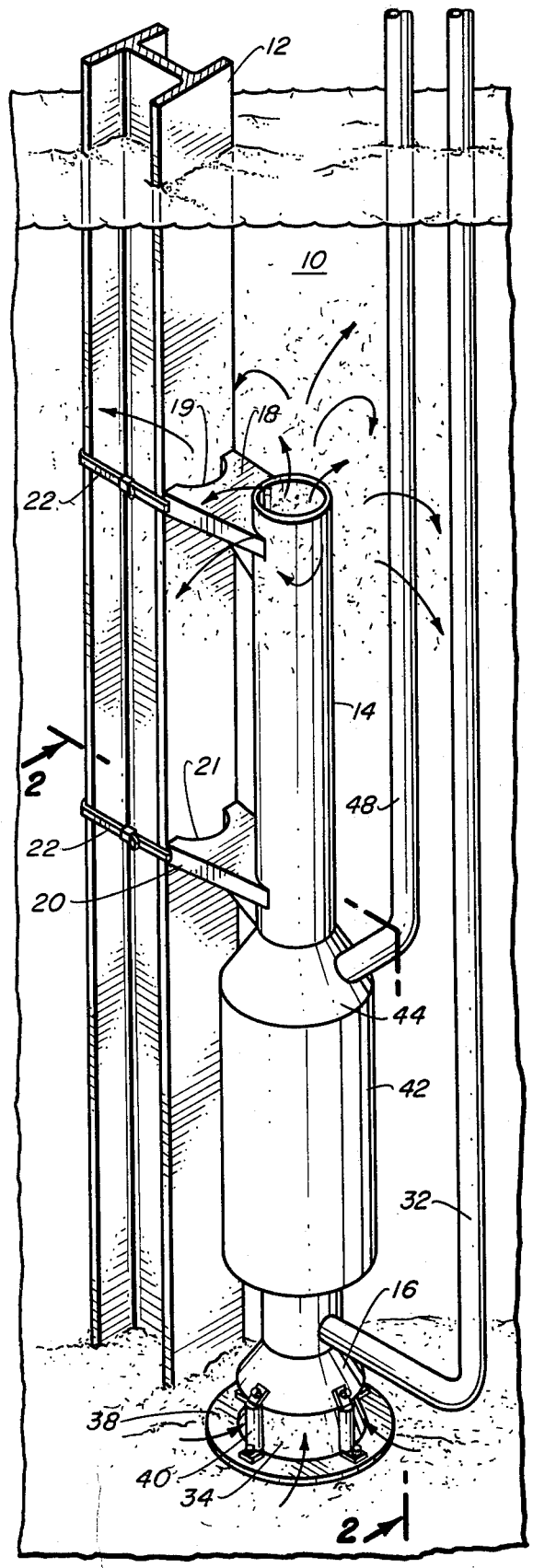
FIG. 1 illustrates the aeration device generally secured beneath a body of water to a piling.

Referring now to FIG. 1, there is shown a body of water 10 in which there is submerged an aeration device according to the invention. The aeration device is comprised of an elongate tube 14 supported in an upright position by a vertical piling 12 by means of saddle blocks or brackets 18 and 20. The saddle blocks 18 and 20 are securely fastened to the elongate tube 14 and are secured to the piling 12 by means of straps 22 passing through the saddle blocks 18 and 20 securely supporting the aeration device. The elongate tube 14 can be of any suitable length but is preferably constructed to permit the upper end to be below the surface of the body of water 10. Water flowing upward through the tube 14 thus exits beneath the surface of the body of water 10 in a swirling vortex as illustrated by the arrows.

Figure 2:
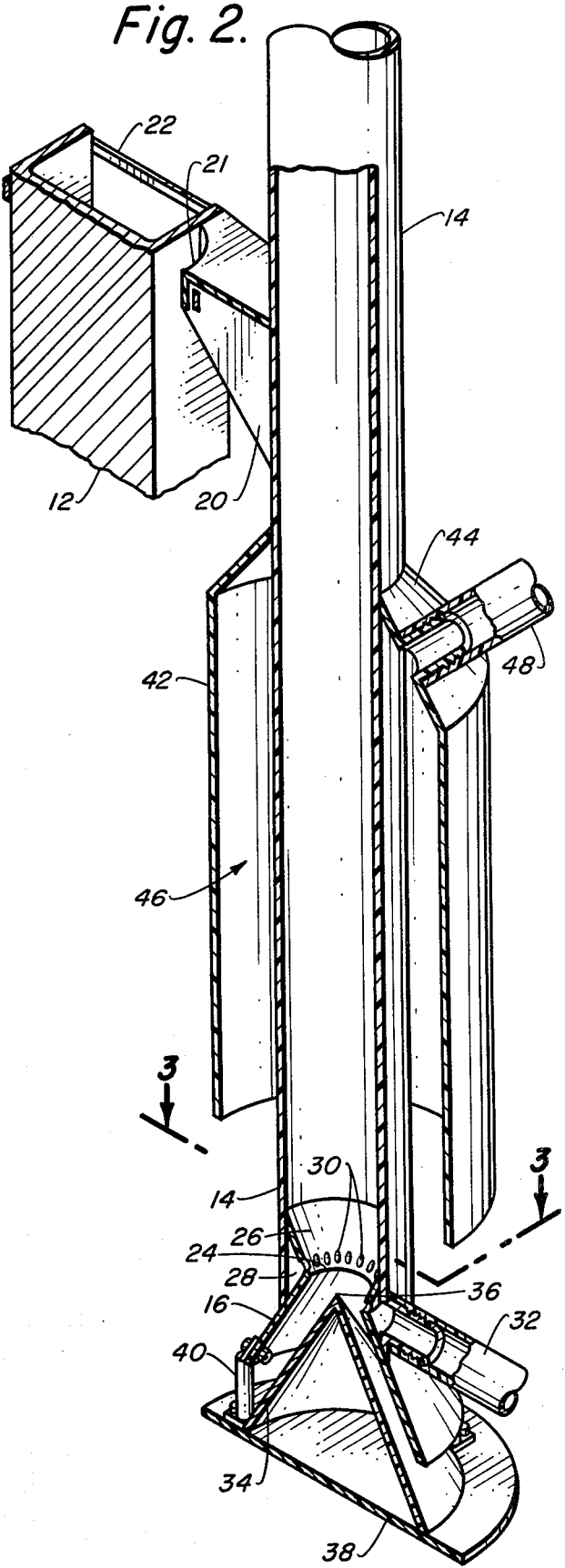
FIG. 2 is a sectional view of the aeration device taken at 2—2 of FIG. 1.

As can be seen in FIG. 2, the bell-shaped member 16 is attached to the lower end of the elongate tube 14 and extends into the interior of the tube, terminating in a venturi restriction or throat 24. An annular ring 26 attached to the terminus end of the bell-shaped member 16 flares outwardly into abutment with the interior of the elongate hollow tube 14. Thus, a chamber 28 is formed between the inside of the elongate tube 14, the bell-shaped member 16 and the annular ring 26.

In order to introduce a gas or air into the interior of the elongate hollow tube 14 a plurality of apertures 30 are provided in the annular ring 26 circumjacent the throat 24 formed by the bell-shaped member 16. To enhance breakup of the gas or air bubbles to a very small size, the apertures 30 are placed as close as possible to the periphery of the venturi throat or restriction 24. Also the apertures 30 are preferably elliptical in design with their major axis on a circular circumference concentric with the periphery of venturi restriction 24.

FIG. 3 shows the apertures 30 on a circumference 31 as close as possible to the peripheral circumference of the throat 24 to maximize injection of the gas into the flow of the liquid through the throat or venturi restriction 24.

Air or any other gas is introduced into the annular chamber 28 through a conduit 32 for discharge into the elongate hollow tube 14 through apertures 30. The discharge of the air through the apertures creates a swirling flow of air and liquid upward through the elongate hollow tube creating a draft through the venturi restriction 24 to form a highly turbulent vortex-like flow thoroughly aerating the liquid or water.

Thus, air or gas introduced into chamber or manifold 28 at the lower end of elongate hollow tube 14 causes air streams to flow out of apertures 30 into the interior of the tube 14 in a swirling fashion. The swirling, rising, minute air bubbles draw water upwardly through the venturi restriction or throat 24 formed at the lower end of tube 14 by the terminal end of bell-shaped member 16. The swirling air stream in cooperation with the throat 24 forms a highly turbulent, swirling, vortex-like flow interior of the tube 14, thoroughly aerating the water as well as suspending biological or chemical solvents and is then discharged through the upper end of the tube for disbursement into the body of water.

The draft or flow velocity up through the tube 14, and also the turbulence, is enhanced by the positioning of a cone 34 beneath the bell-shaped member 16. As is readily apparent from the figures, the inclusive angle or sides of the cone 34 are substantially parallel with the inclusive angle or flare of the bell-shaped member 16. Also, it is preferable to have the apex 36 of the cone 34 extend to a point proximate the throat 24 produced by the bell-shaped member 16.

In order to unitize the construction of the aeration device, the cone 34 is attached to a base plate 38 secured to the elongate tube by means of adjustable legs 40 which are easily attached to the lower end of the bell-shaped member 16. With legs 40 being extendable and adjustable, the position of the cone 34 inside the entrance to the bell-shaped member can be varied to increase or decrease the volume or velocity of liquid flowing through the throat 24. Moving the cone 34 outward would widen the gap between the cone and the bell-shaped member 16 increasing the volume of liquid flowing through the throat 24, but of course decreasing the flow velocity. The movement of the cone 34 in the opposite direction will, of course, have the opposite effect.

Since these aeration devices often are of necessity quite large, on the order of ten feet or more in length, and upwards of two feet in overall diameter, it would be desirable to provide some method to simplify their maneuverability for repair and/or replacement. For this reason a collar 42 attached by means of a downwardly flared skirt 44 secured to the outside of the elongate hollow tube 14 is provided. This collar 14 thus provides a cavity 46 between the outside of the elongate tube 14 and the inside of the collar 42 which can be opened or closed at the bottom. A conduit 48 may be secured to the collar or skirt to provide a gas to the cavity or chamber 46 tending to cause the aeration device to float. With a gas or air pumped into the cavity 46, the aeration device can now be easily lifted from the body of water 10 or maneuvered to another position, if desired.

For waste water aeration and purification, air is pumped through conduit 32 into annular chamber 28 for discharge through apertures 30. The apertures, preferably elliptical in shape, cause the breakup of the gas into very minute bubbles creating a draft or suction in the throat 24, drawing fluid up through the bell-shaped member into the interior of the hollow tube 14 and out through the upper end as indicated by the arrows in FIG. 1. The gas or air is broken up into such minute bubbles that the flow through the upper end of hollow tube 14 has the appearance of foam rather than air bubbling through water. Thus, there is a maximum transfer or addition of gas or oxygen to the water.

In addition to provide maximum transfer of oxygen to the water, the positioning of the chamber and apertures 30 as they are, minimizes any potential clogging of the system and also reduces the amount of power needed to inject or discharge a gas into the interior of hollow tube 14. The backspin mixing or induced turbulence described previously is caused by the high velocity flow of liquid through the venturi throat 24, causing a negative pressure above the apertures 30 around the periphery of flared skirt 26. The high induced turbulence and low-pressure area above the apertures breaks up air bubbles into microfine bubbles as well as breaking up any solids to their lowest common denominator. Also, apertures 30 are very unlikely to become clogged because there is very little flow opposite to the upstream direction, even when the supply of gas is cut off. This is because the apertures 30 are upstream of the entrance to bell-shaped member 16 and throat 24. Thus, when air or gas is cut off to chamber 28, very little backflow takes place down through hollow tube 14.

As illustrated in FIGS. 1 and 2, the aeration device is supported in an upright position by saddle blocks 18 and 20 which may be strapped to a piling 12. The saddle blocks 18 and 20 include curved portions 19 and 21 in order to accommodate rectangular, square, or cylindrical pilings. However, the aeration device can be made freestanding as illustrated in FIG. 4. In FIG. 4 the aeration device is substantially the same as shown in FIG. 2, except that the cone 34 may be filled with concrete to provide additional weight to hold the aeration device in a freestanding position. In addition, slots 50 may be provided in the base plate around the periphery of base plate 38 through which sand spikes 52 can be driven to secure the aeration device to the bottom of a body of water. The number of spikes 53 used will depend upon the particular circumstances for which the aeration device is used. That is, whether there is any motion in the water, such as tidal flow or in a moving stream. Other considerations are also whether the aeration device is to be a permanent installation.

In waste water treatment, aeration devices are used to add or transfer oxygen to the water. However, there is sometimes an additional need to mix volatile substances or chemicals to the water to neutralize, react or remove other harmful chemicals and/or bacteria. For example, purification is sometimes enhanced by the addition of chlorine to the water. In order to permit the addition and mixing of a chemical, simultaneously with the transfer or addition of oxygen through the aeration process, a conduit 52 is provided in the cone 34 passing through the center and exiting at 54 in the apex 36 of the cone 34. Thus, a chemical can be discharged into the flow of fluid for thorough mixing simultaneously while aeration is occurring. A chemical may be supplied through conduit 52 in cone 34 exiting at the venturi throat 24 for thorough mixing by the swirling vortex created by the gas discharged into the flow through apertures 30.

A further modification may be provided as illustrated in FIG. 5 for injection of additional chemicals. This is accomplished by providing a rolled edge 56 on annular ring or skirt 26, producing an annular channel 58 between the rolled edge and the interior of the hollow tube 14. The channel could be closed to form a second chamber, if desired. A conduit 60 may then be connected to the hollow tube 14 intersecting with the channel 58 for introduction of additional chemicals. Several of these conduits could be attached to the hollow tube 14 around the annular ring or skirt 26, if desired. Thus, several additional chemicals could be added during the aeration process. Additionally, of course, the conduit 52 terminating at the apex of cone 34 could be a multiple or several conduits allowing the injection of several chemicals into the throat 24 of the venturi restriction separately or simultaneously.

Thus, there has been described an aeration device which maximizes transfer of a gas or oxygen to a liquid or water. The aeration device can be at a fixed location or can be made mobile by use of a flotation collar. The aeration device provides for the simultaneous injection of one or more chemicals during aeration of a liquid for waste water treatment. Air introduced at the bottom of the elongate tube for aeration of the waste water draws the water through a venturi restriction wherein chemicals may be simultaneously added. As water is drawn into the venturi restriction, waste products are also drawn in with the water and broken down by backspin mixing or induced turbulence and suspended for promotion of biochemical, chemical, and bacteriological processes. The aeration process is maximized while the power required for driving the system is minimized. It should be noted that the system can also be used horizontally without the base 38 and cone 34, if desired.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. An aeration device for adding gases to a liquid medium comprising:
   an elongate hollow tube;
   support means for supporting said elongate tube upright in said liquid;
   a bell-shaped member on the lower end of said tube;
   said bell-shaped member terminating inside said tube in a throat of smaller cross-section than said tube;
   an annular ring flaring outwardly from said bell-shaped member throat into abutment with the inside surface of said tube forming an annular chamber between the tube, bell-shaped member and ring;
   a plurality of spaced apertures in said ring positioned substantially on the peripheral edge of said throat;
   supply means for supplying a gas to said chamber;
   a cone positioned beneath the entrance to said bell-shaped member;
   whereby the gas discharged through the apertures in said skirt causes a swirling stream of liquid to rise through said tube;
   a collar attached to the outside of said tube forming a cavity between the outside of the tube and the inside of said collar; and
   gas supply means for supplying a gas to said cavity whereby said collar can be used as a flotation collar for maneuvering said aeration device.

* * * * *